(12) United States Patent
Singh

(10) Patent No.: US 11,558,812 B2
(45) Date of Patent: Jan. 17, 2023

(54) SYSTEM AND METHODS FOR MULTI-LINKS SD-WAN USING CELLULAR DEVICE CONNECTIONS

(71) Applicant: Citrix Systems, Inc., Fort Lauderdale, FL (US)

(72) Inventor: Daljit Singh, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/850,572

(22) Filed: Apr. 16, 2020

(65) Prior Publication Data

US 2021/0329542 A1 Oct. 21, 2021

(51) Int. Cl.

| | |
|---|---|
| *H04W 48/18* | (2009.01) |
| *H04W 12/06* | (2021.01) |
| *H04W 28/08* | (2009.01) |
| *H04W 36/14* | (2009.01) |
| *H04W 48/16* | (2009.01) |
| *H04W 60/00* | (2009.01) |
| *H04W 88/06* | (2009.01) |

(52) U.S. Cl.
CPC ........... *H04W 48/18* (2013.01); *H04W 12/06* (2013.01); *H04W 28/08* (2013.01); *H04W 36/14* (2013.01); *H04W 48/16* (2013.01); *H04W 60/005* (2013.01); *H04W 88/06* (2013.01)

(58) Field of Classification Search
CPC ..... H04W 48/18; H04W 12/06; H04W 28/08; H04W 36/14; H04W 48/16; H04W 60/005; H04W 88/06
See application file for complete search history.

(56) References Cited

U.S. PATENT DOCUMENTS

| | | | | |
|---|---|---|---|---|
| 8,855,012 | B1 | 10/2014 | Suri | |
| 2010/0279647 | A1* | 11/2010 | Jacobs | H04B 7/15507 455/404.1 |
| 2010/0330988 | A1* | 12/2010 | Granlund | H04W 48/18 455/434 |
| 2017/0150543 | A1* | 5/2017 | Jung | H04W 76/10 |
| 2017/0353380 | A1* | 12/2017 | Ergen | H04L 45/24 |
| 2019/0319873 | A1 | 10/2019 | Shelar et al. | |

(Continued)

OTHER PUBLICATIONS

International Search Report and Written Opinion on PCT Appl. No. PCT/US2021/026167 dated Jun. 21, 2021.

(Continued)

*Primary Examiner* — Dai Phuong
(74) *Attorney, Agent, or Firm* — Foley & Lardner LLP

(57) ABSTRACT

Systems and methods for multi-links software-defined wide area network (SD-WAN) using phone mobile hotspots include a network device that receives, from a client, a request to establish a connection with a data source. The network device may select, responsive to receiving the request, a connection between the network device and one of the first registered cellular device or the second registered cellular device via which the network device is to transmit network traffic corresponding to the request, the first registered cellular device and the second registered cellular device registered with the network device and having a respective cellular connection. The network device may transmit network traffic corresponding to the request from the client via the connection to the data source.

20 Claims, 10 Drawing Sheets

500

(56) References Cited

U.S. PATENT DOCUMENTS

2020/0015302 A1   1/2020  Shikari et al.
2020/0245384 A1*  7/2020  Jacobs .................. H04W 12/00
2021/0006991 A1*  1/2021  Rucker .................. H04W 4/70

OTHER PUBLICATIONS

International Preliminary Report on Patentability on PCT Appl. No. PCT/US2021/026167 dated Oct. 27, 2022.

* cited by examiner

SYSTEM AND METHODS FOR MULTI-LINKS SD-WAN USING CELLULAR DEVICE CONNECTIONS

FIELD OF THE DISCLOSURE

The present application generally relates to networking, including but not limited to systems and methods for multi-links SD-WAN using cellular device connections.

BACKGROUND

Various services may be used, accessed, or otherwise provided to users via their respective client devices. Some services may be updated from time to time. For instance, a new version of the service may be deployed for users to access via their client device. As part of the deployment of new versions of services, some new versions may perform at less than desired specifications.

SUMMARY

This Summary is provided to introduce a selection of concepts in a simplified form that is further described below in the Detailed Description. This Summary is not intended to identify key features or essential features, nor is it intended to limit the scope of the claims included herewith.

Systems and methods for networking via an SD-WAN are described herein. More particularly, the systems and methods described herein leverage cellular device hotspots for establishing multiple links to an SD-WAN.

Currently, most homeowners, business owners, etc. use an internet service protocol (ISP) device, such as a cable modem, a digital subscriber line (DSL), fiber connection, etc. for connecting to the internet. Typically, a data connection line is introduced at a premise (e.g., home/office space), which is connected to a cable modem. The cable modem may then be connected to a router (or a router may be integrated within the cable modem) for providing a wide area network (WAN) within the premise. As cellular devices shift from 4G to 5G technology, more people may shift away from this typical configuration and opt for leveraging their cellular devices for providing a connection to the internet. However, using cellular devices for providing a connection to the internet does not come without potential drawbacks. For example, since cellular devices are mobile, it may not be feasible to maintain consistent internet connectivity as cellular devices come and go within the premises. As such, where a person with a cellular device which is being used for providing a connection to the internet leaves the premises, all other devices which were using that connection may be disconnected from the internet.

According to the implementations and embodiments described herein, a network device (such as a software defined (SD)-WAN device) registers a first cellular device having a first cellular connection and registers a second cellular device having a second cellular connection. The network device may receive a request to establish a connection with a data source from a client. The network device may determine one of the first cellular device or second cellular device is within range of the network device. The network device may establish a connection with one of the first cellular device or the second cellular device. The network device may transmit the request from the client via the connection to the data source.

Such implementations and embodiments may ensure consistent internet connections for clients within a premise by dynamically selecting connections to the first and/or second cellular device. For example, the network device may monitor various network conditions (e.g., conditions of the connection between the network device and respective cellular devices, condition of the connections between the cellular devices and the internet or a second network device, etc.). The network device may route traffic flow (or individual packets) based on the network conditions. Such implementations and embodiments may decrease latency and increase reliability of the internet connections for the clients. Furthermore, where the network device establishes multiple connections to cellular devices located on premises, the network device may pool the connections for increasing overall bandwidth. Such implementations may also provide for link redundancy, which may increase reliability by dynamically switching traffic flow based on respective network conditions. Various other advantages are described in greater detail below.

In one aspect, this disclosure is directed to a method. The method includes receiving, by a network device from a client, a request to access a data source. The method includes selecting, by the network device responsive to receiving the request, a connection between the network device and one of a first registered cellular device or a second registered cellular device via which the network device is to transmit network traffic corresponding to the request. The first registered cellular device and the second registered cellular device may be registered with the network device and having a respective cellular connection. The method includes transmitting, by the network device, network traffic corresponding to the request from the client via the connection to the data source.

In some embodiments, the network device is a first network device downstream from the first cellular device and the second cellular device and the connection is a first connection. The method may further include causing, by the first network device, a plurality of second connections to be established by the first cellular device and the second cellular device to a second network device arranged upstream from the first cellular device and the second cellular device. In some embodiments, the method further includes transmitting, by the first network device, a first portion of network packets of the network traffic via the first connection to the first cellular device, and transmitting, by the first network device, a second portion of network packets of the network traffic via a third connection to the second cellular device. In some embodiments, the method further includes receiving, by the first network device from the second network device via the first connection to the first cellular device, a first packet of the network traffic for the client, and receiving, by the first network device from the second network device via the second connection to the second cellular device, a second packet of the network traffic for the client.

In some embodiments, the method further includes receiving, by the network device from the client, a priority of the first cellular device relative to the second cellular device. The method may further include selecting, by the network device, the connection between the network device and the first cellular device via which the network device is to transmit the network traffic corresponding to the request based on the priority from the client. In some embodiments, establishing the connection with one of the first cellular device or the second cellular device includes establishing, by the network device, a first connection with the first cellular device, and establishing, by the network device, a second connection with the second cellular device. In some embodiments, the method further includes determining, by the network device, that the first cellular device is out of range from the network device. The method may further include routing, by the network device, the network traffic of the first connection to the second connection.

In some embodiments, the connection is a first connection with the first cellular device. The method may further include monitoring, by the network device, one or more first conditions of the first connection between the network device and the first cellular device. The method may further include monitoring, by the network device, one or more second conditions of a second connection between the network device and the second cellular device. In some embodiments, the method may further include switching, by the network device, from the first connection to the second connection for which to route network traffic based on the one or more first conditions and the one or more second conditions. In some embodiments, switching from the first connection to the second connection is performed based on a comparison of the one or more first conditions to a threshold and a comparison of the one or more second conditions to the threshold.

In another aspect, this disclosure is directed to a system. The system includes a network device configured to receive, from a client, a request to access a data source. The network device may be configured to select, responsive to receiving the request, a connection between the network device and one of a first registered cellular device or a second registered cellular device via which the network device is to transmit network traffic corresponding to the request. The first registered cellular device and the second registered cellular device may be registered with the network device and having a respective cellular connection. The network device may be configured to transmit network traffic corresponding to the request from the client via the connection to the data source.

In some embodiments, the network device is a first network device downstream from the first cellular device and the second cellular device and the connection is a first connection. The first network device may be further configured to cause a plurality of second connections to be established by the first cellular device and the second cellular device to a second network device arranged upstream from the first cellular device and the second cellular device. In some embodiments, the first network device is further configured to transmit a first portion of network packets of the network traffic via the first connection to the first cellular device, and transmit a second portion of network packets of the network traffic via a third connection to the second cellular device. In some embodiments, the first network device is further configured to receive, from the second network device via the first connection to the first cellular device, a first packet of the network traffic for the client, and receive, from the second network device via the second connection to the second cellular device, a second packet of the network traffic for the client.

In some embodiments, the network device is further configured to receive, from the client, a priority of the first cellular device relative to the second cellular device. The network device may further be configured to select the connection between the network device and the first cellular device via which the network device is to transmit the network traffic corresponding to the request based on the priority from the client. In some embodiments, establishing the connection with one of the first cellular device or the second cellular device includes establishing a first connection with the first cellular device, and establishing a second connection with the second cellular device. In some embodiments, the network device is further configured to determine that the first cellular device is out of range from the network device. The network device may further be configured to route the network traffic of the first connection to the second connection.

In some embodiments, the connection is a first connection with the first cellular device. The network device may be further configured to monitor one or more first conditions of the first connection between the network device and the first cellular device. The network device may be further configured to monitor one or more second conditions of a second connection between the network device and the second cellular device. In some embodiments, the network device is further configured to switch, from the first connection to the second connection for which to route network traffic based on the one or more first conditions and the one or more second conditions. In some embodiments, switching from the first connection to the second connection is performed based on a comparison of the one or more first conditions to a threshold and a comparison of the one or more second conditions to the threshold.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, with emphasis instead being placed upon illustrating embodiments, principles, and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for providing a clustered appliance architecture environment;

Section D describes embodiments of systems and methods for providing a clustered appliance architecture environment; and Section E describes embodiments of systems and methods for multi-link SD-WAN using cellular device connections.

A. Network and Computing Environment

Figure 1A:
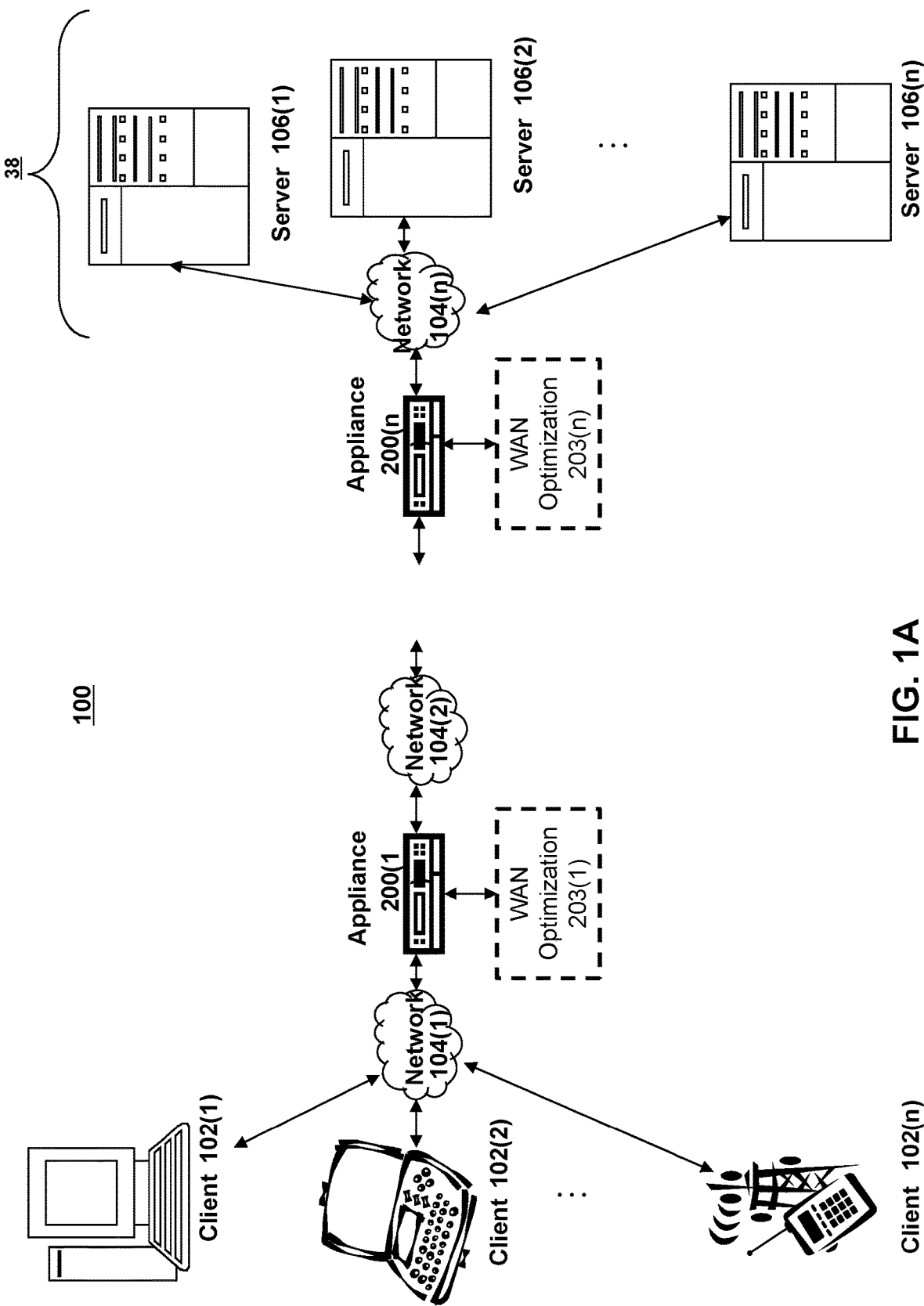
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106.

In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. In some embodiments, the WAN optimization appliance(s) 205 may be used for optimizing a software-defined WAN (SD-WAN). For example, WAN optimization appliance 205 may accelerate, cache, compress or otherwise optimize or improve performance, operation, flow control, or quality of service of network traffic, such as traffic to and/or from a WAN (or SD-WAN) connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
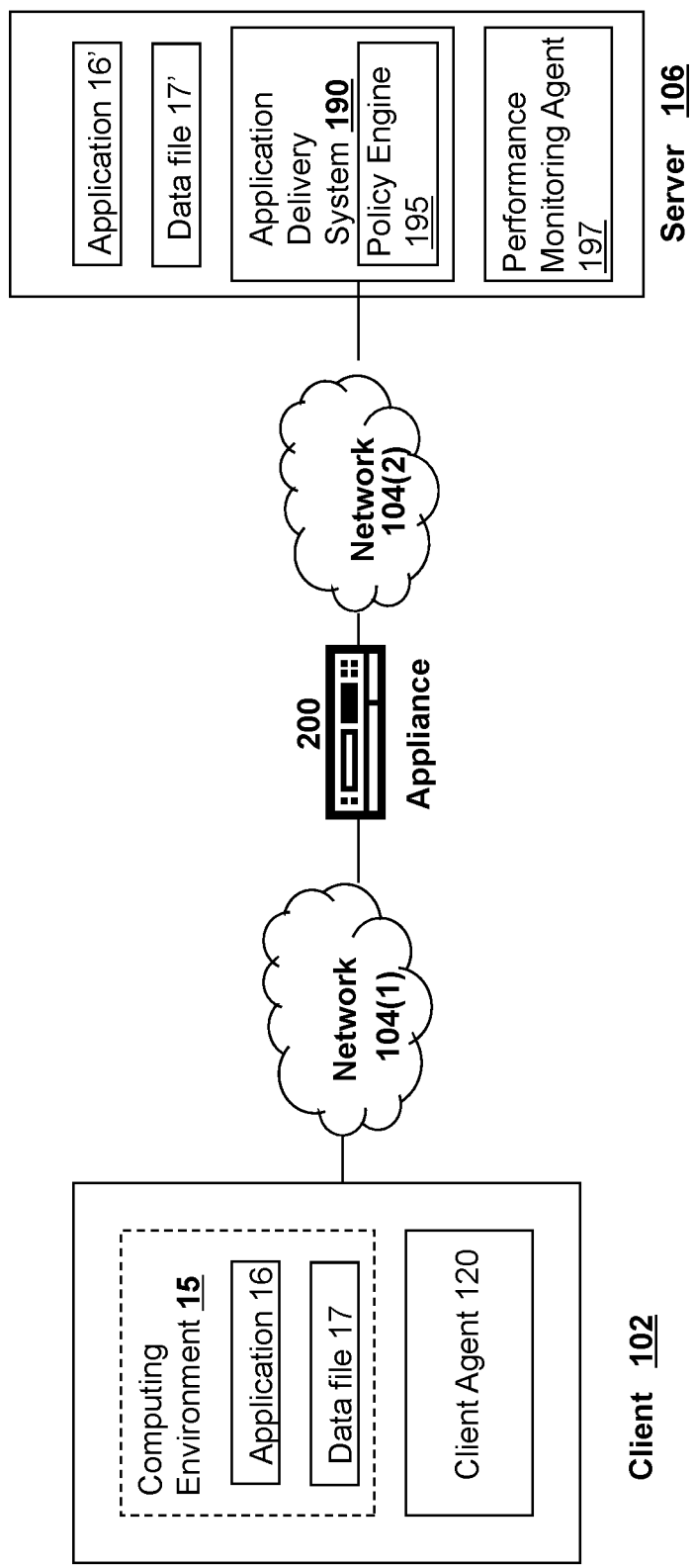
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS), platform as a service (PaaS), a CITRIX managed desktop service (CMD service) or a CITRIX virtual applications and desktops service (CVAD service).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
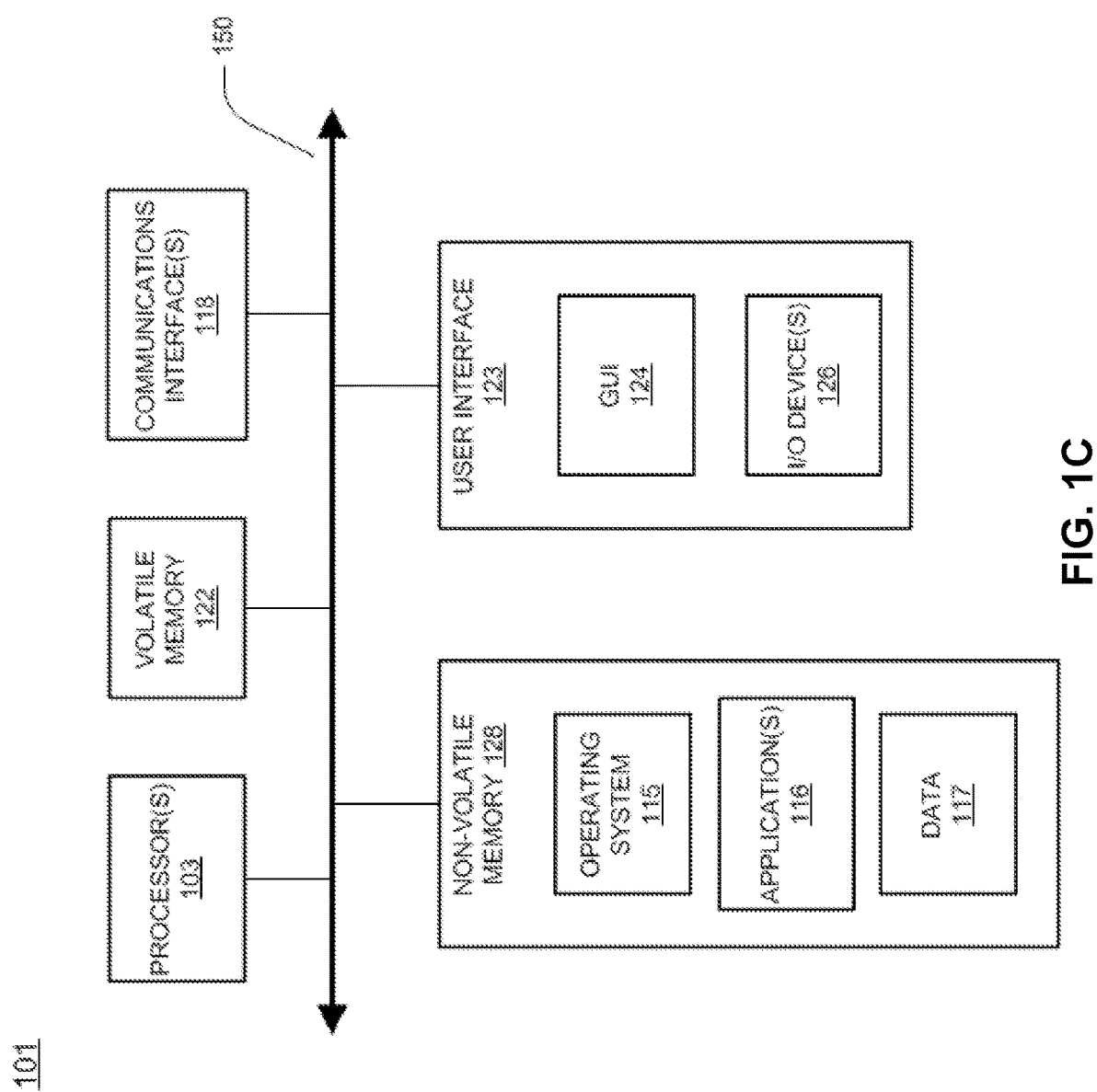
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
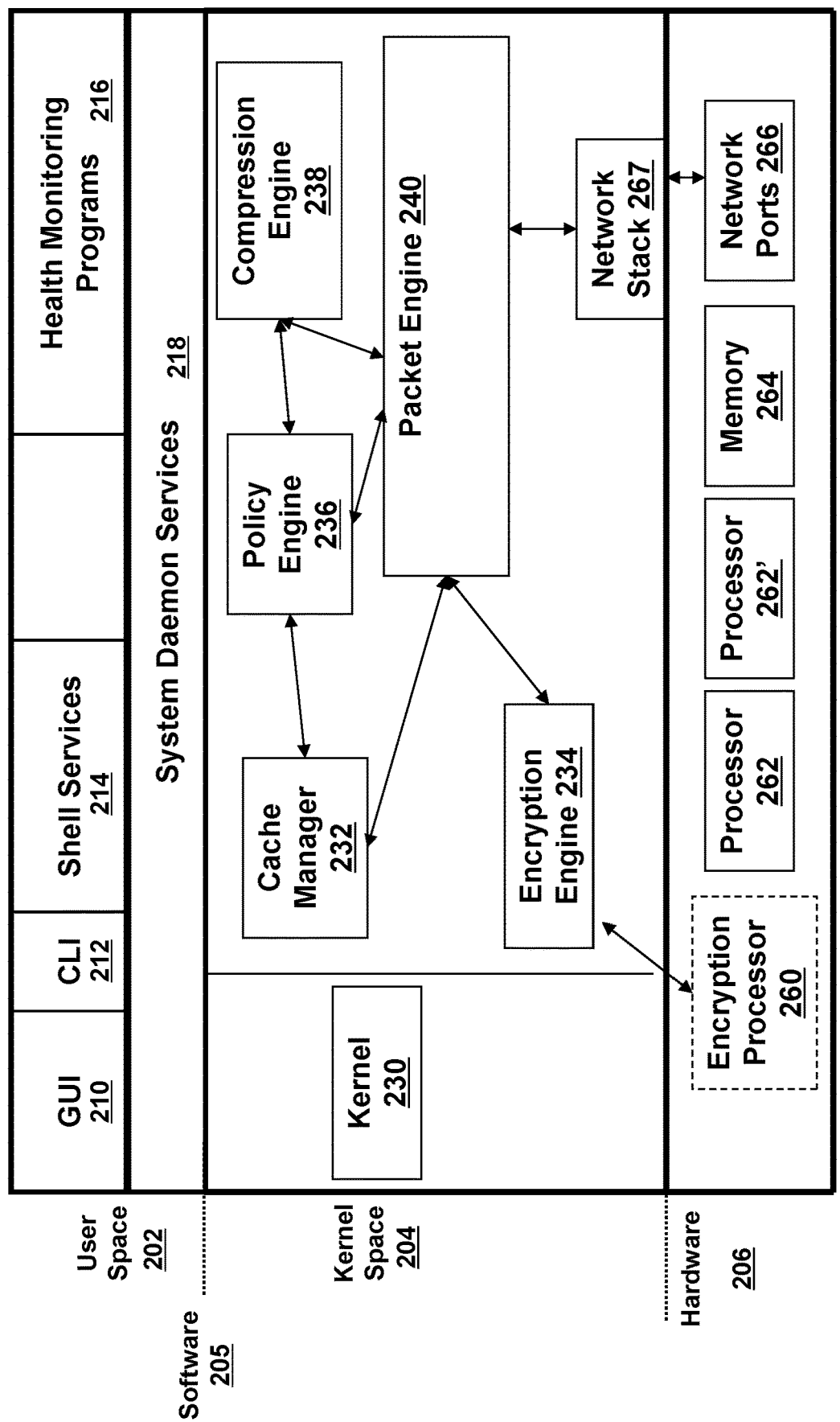
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Virtualizing an Application Delivery Controller

Figure 3:
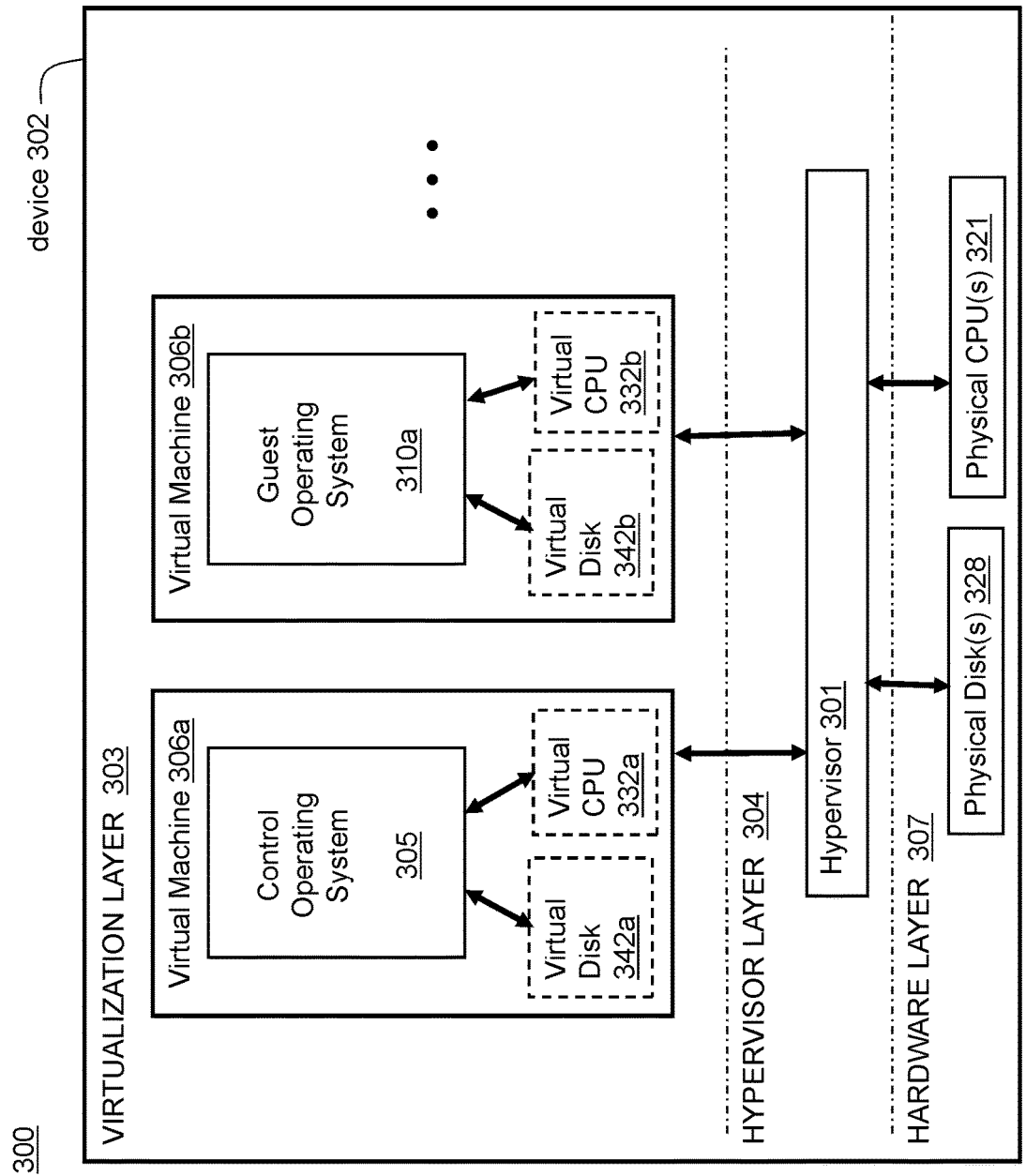
FIG. 3 is a block diagram of a virtualization environment, in accordance with an illustrative embodiment.

Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
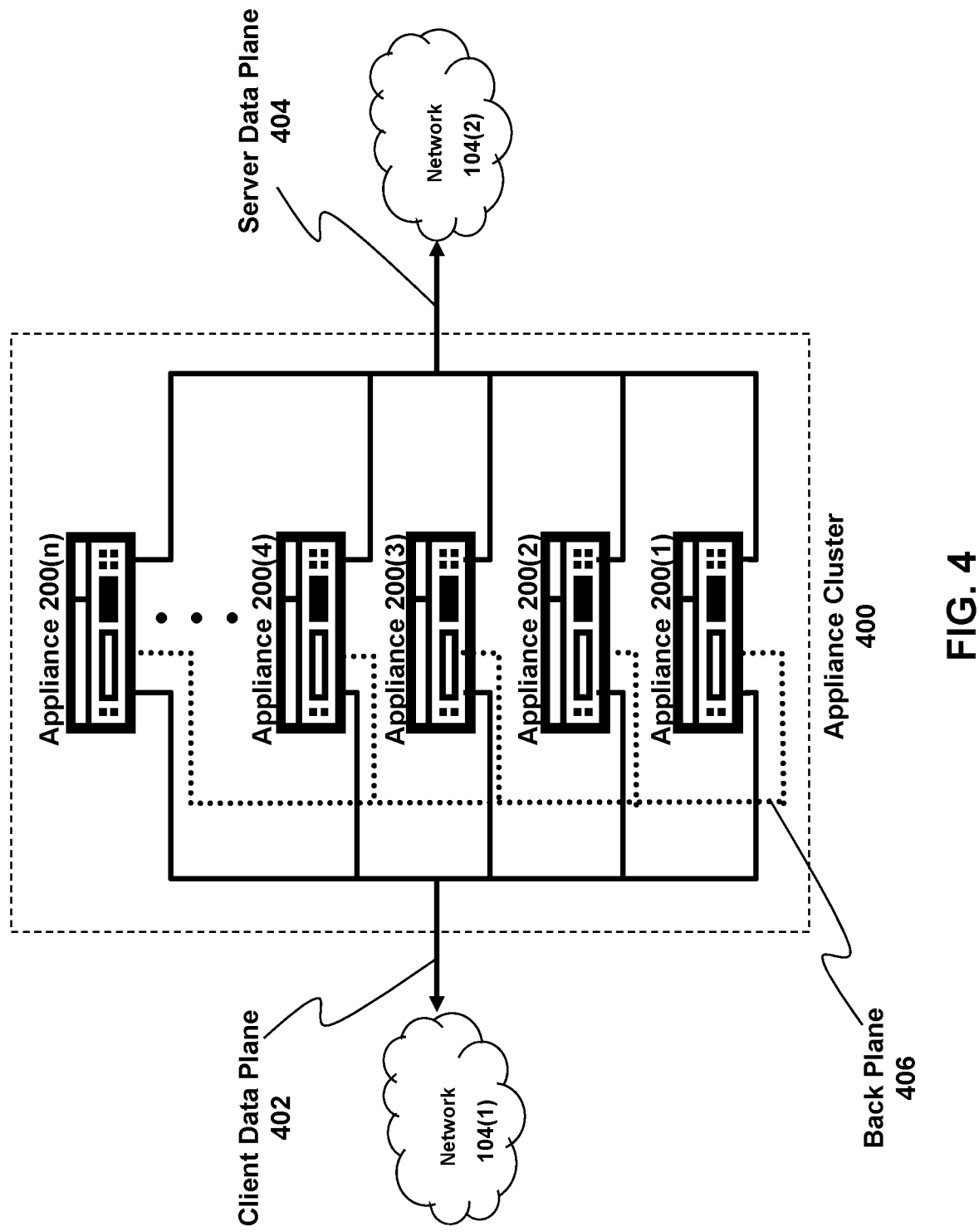
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

E. Systems and Methods for Multi-Links SD-WAN Using Cellular Device Connections

Systems and methods for networking via an SD-WAN are described herein. More particularly, the systems and methods described herein leverage cellular device connections or hotspots for establishing multiple links to an SD-WAN.

Currently, most homeowners, business owners, etc. use an internet service protocol (ISP) device, such as a cable modem, a digital subscriber line (DSL), fiber connection, etc. for connecting to the internet. Typically, a data connection line is introduced at a premise (e.g., home/office space), which is connected to a cable modem. The cable modem may then be connected to a router (or a router may be integrated within the cable modem) for providing a wide area network (WAN) within the premise. As cellular devices shift from 4G to 5G technology, more people may shift away from this typical configuration and opt for leveraging their cellular devices for providing a connection to the internet. However, using cellular devices for providing a connection to the internet does not come without potential drawbacks. For example, since cellular devices are mobile, it may not be feasible to maintain consistent internet connectivity as cellular devices come and go within the premises. As such, where a person with a cellular device that is being used for providing a connection to the internet leaves the premises, all other devices which were using that connection may be disconnected from the internet.

According to the implementations and embodiments described herein, a network device (such as a software defined (SD)-WAN device) can register a first cellular device having a first cellular connection and can register a second cellular device having a second cellular connection. The network device may receive a request to establish a connection with a data source from a client. The network device may determine one of the first cellular device or second cellular device is within range of the network device. The network device may establish a connection with one of the first cellular device or the second cellular device. The network device may transmit the request from the client via the connection to the data source.

Such implementations and embodiments may ensure consistent internet connections for clients within a premise by dynamically selecting connections to the first and/or second cellular device. For example, the network device may monitor various network conditions (e.g., conditions of the connection between the network device and respective cellular devices, condition of the connections between the cellular devices and the internet or a second network device, etc.). The network device may route traffic flow (or individual packets) based on the network conditions. Such implementations and embodiments may decrease latency and increase reliability of the internet connections for the clients. Furthermore, where the network device establishes multiple connections to cellular devices located on premises, the network device may pool the connections for increasing overall bandwidth. Such implementations may also provide for link redundancy, which may increase reliability by dynamically switching traffic flow based on respective network conditions. Various other advantages are described in greater detail below.

Figure 5A:
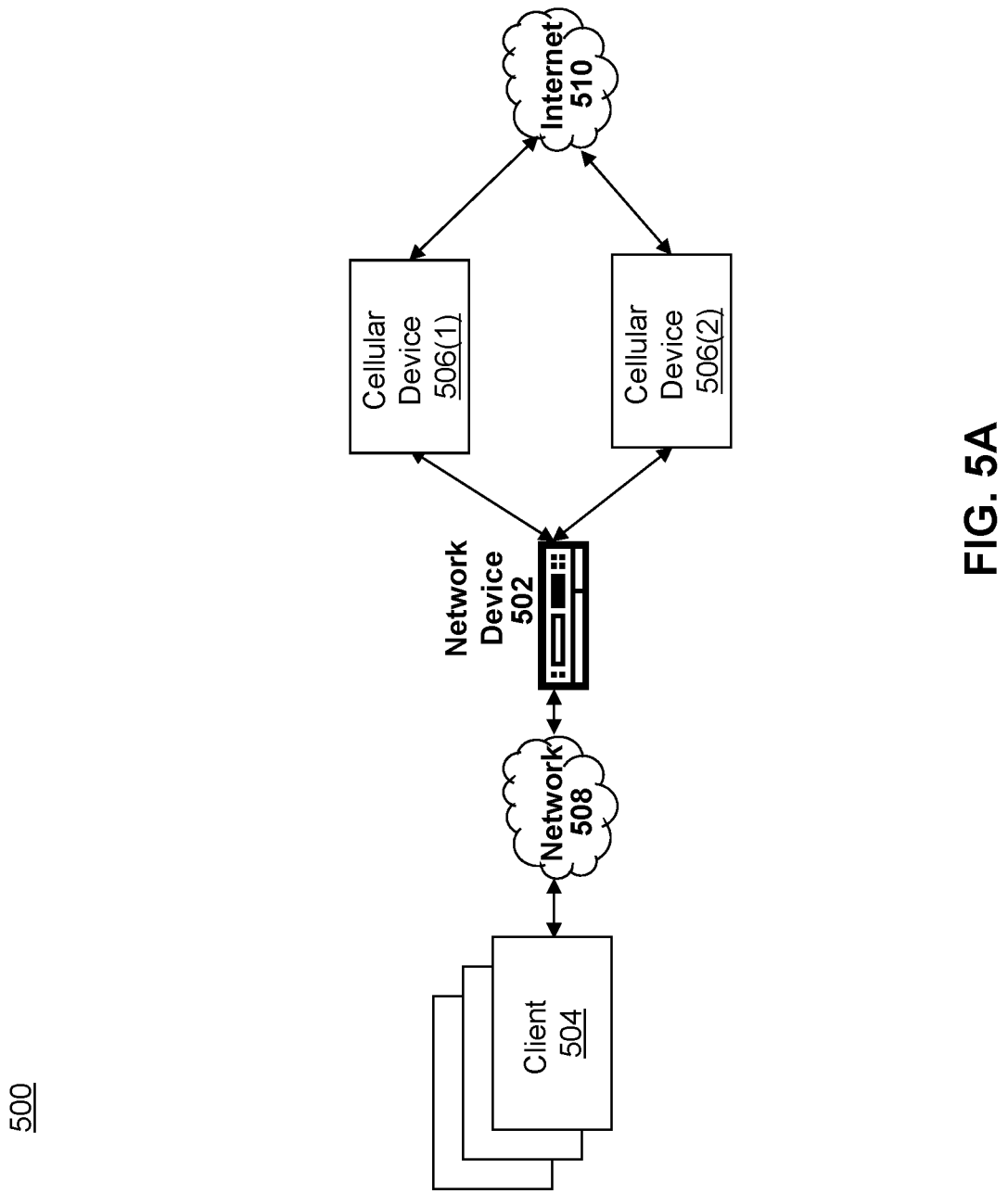
FIG. 5A is a block diagram of a system for multi-link SD-WAN, according to an illustrative embodiment.
Figure 5B:
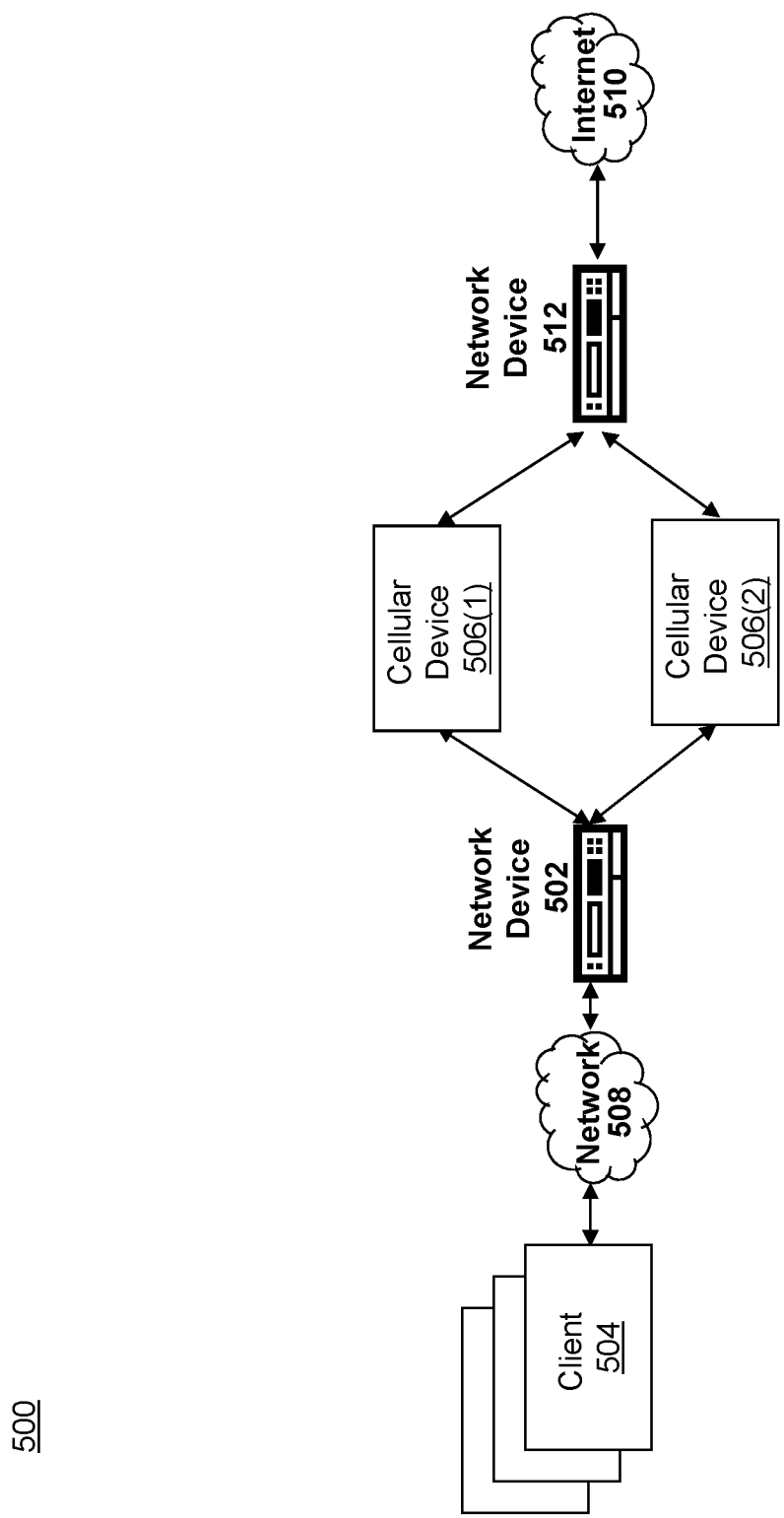
FIG. 5B is a block diagram of a system for multi-link SD-WAN, according to another illustrative embodiment.

Referring now to FIG. 5A and FIG. 5B, depicted are block diagrams of a system 500 for multi-link SD-WAN, according to illustrative embodiments. The system 500 is shown to include a network device 502 arranged between a plurality of clients 504 and a plurality of cellular devices 506. In the embodiment shown in FIG. 5A, the cellular devices 506 may be used for connecting the clients 504 directly to the internet 510. In the embodiment shown in FIG. 5B, the cellular devices 506 may be connected to a second network device 512, which is then used for connecting the clients 504 to the internet 510 (e.g., the first network device 502 is arranged downstream from the cellular devices 506 and the second network device 512 is arranged upstream from the cellular devices 506). The network device 502 may be configured to register the first cellular device 506(1) having a first cellular connection and the second cellular device 506(2) having a second cellular connection. The network device may receive a request to establish a connection with a data source (e.g., an internet connection) from a client. In this regard, intermediary device 502 may manage traffic between, for instance, a first version 510A and a second version 510B of the plurality of versions of the service 510, based on DNS responses from the DNS controller 506, as described in greater detail below.

The systems and methods of the present solution may be implemented in any type or form of device, including clients, servers or appliances described above with reference to FIG. 1A-FIG. 4. For instance, the network devices, 502 512 may be implemented as embodied upon or otherwise incorporated into an appliance 200 described above with reference to FIG. 2-FIG. 4. The clients 504 and cellular devices 506 may be similar in some respects to the clients 102 described above with respect to FIG. 1A-FIG. 1B. In some embodiments, a client 504 may also be a cellular device 506 (and vice versa). The cellular devices 506 may include any device having a cellular connection (e.g., a CDMA, LTE, 3G, 4G, 5G, etc.). In some embodiments, the cellular devices 506 may be mobile devices. In other words, the network devices 502, 512, the clients 504, the cellular devices 506, etc. may include or incorporate components and devices similar in some aspects to those described above with reference to FIG. 1C, such as a memory and/or one or more processors operatively coupled to the memory. The present systems and methods may be implemented in any embodiments or aspects of the appliances or devices described herein.

The network device 502 may be located at the client-side premises (e.g., at a home, office, etc.). Hence, the network device 502 may be a client-side network device. In some embodiments, the network device 502 may be a software-defined wide area network (SD-WAN) Wi-Fi enabled access point. The network device 502 may be configured to output, transmit, establish, or otherwise provide a Wi-Fi network 508 within the client-side premises. Hence, the network device 502 may be configured to facilitate communication between the clients 502 (e.g., via the Wi-Fi network 508) and the internet 510. As described in greater detail below, the network device 502 may be configured to facilitate communication between the clients 502 and the internet 510 by leveraging cellular connections of one or more cellular devices 506 within range of the network device 502 (e.g., also located at the client-side premises).

The network device 502 may be configured to register one or more cellular devices 506. In some embodiments, the network device 502 may be configured to register one or more cellular devices 506 based on the cellular devices 506 being paired with the network device 506. For example, a user of the cellular device 506 may pair the cellular device 506 with the network device 506 (e.g., by performing a search for the network device 506 using the cellular device 506, selecting the network device 506, and the cellular device 506 and network device 506 exchanging one or more handshake packets). In some embodiments, the cellular device 506 may be paired with the network device 506 via BLUETOOTH. For example, the cellular device 506 may include a BLUETOOTH emitter and receiver, and the network device 502 may include a BLUETOOTH emitter and receiver. The cellular device 506 may be configured to pair with the network device 502 by exchanging one or more packets between the cellular device 506 and network device via the BLUETOOTH emitter and receiver. In some embodiments, the cellular device may be paired with the network device using one or more short range wireless communication protocols or one or more long range wireless protocols. In some embodiments, the cellular devices can be registered with the network device manually. An administrator or user can provide one or more device identifiers of the cellular device to the network device, for instance, via a user interface, such that the network device can store the device identifier of the cellular device in a particular location for the purpose of registering the cellular device. In some embodiments, an application that is configured to communicate with the network device may be installed on the cellular device. In some embodiments, a user of the cellular device can register the cellular device with the network device via the application. In some embodiments, the registration process can include providing the network device information relating to one or more communication ports or communications device identifiers (such as a unique identifier associated with a BLUETOOTH module of the cellular device or a WIFI module of the cellular device or any other communication module of the cellular device.

In some embodiments, the cellular devices 506 may be class-1 cellular devices. For example, the cellular device 506 may have, for instance, a class-1 BLUETOOTH emitter and receiver (e.g., with approximately a 10 m range). In some embodiments, the cellular devices 506 may be class-2 cellular devices. For example, the cellular device 506 may have, for instance, a class-2 BLUETOOTH emitter and receiver (e.g., with approximately 100 m range). In some embodiments, some cellular devices 506 registered with the network device 502 may be class-1 cellular devices, while other cellular devices 506 registered with the network device 502 may be class-2 cellular devices. In either embodiment, when the cellular devices 506 are within range of the network device 502 to which the cellular devices 506 are registered, the network device 502 may be configured to automatically establish a connection with the respective cellular device 506. Consequently, when the cellular devices 506 are out of range, the network device 502 may be configured to disconnect with the respective cellular device 506.

The cellular devices 506 may be configured to provide a cellular connection to the network devices 502. For example, the cellular devices 506 may be configured to output a mobile device "hotspot" (e.g., a network which can be connected to by devices for using the cellular connection of the cellular device 506). Each of the devices which are registered to the cellular devices 506 may be configured to connect to the mobile device hotspot of the cellular devices 506. Accordingly, the devices which are registered to the cellular devices 506 may be configured to leverage the cellular connection of the cellular devices 506. As described above, the network devices 502 may be configured to register the cellular devices 506. The network devices 502 may be configured to connect to the mobile device hotspots of the cellular devices 506 for leveraging the cellular connections of the cellular devices 506, as described in greater detail below.

The network device 502 may be configured to determine one or more of the registered cellular devices 506 are within range of the network device 502. In some embodiments, the network device 502 may be configured to determine a registered cellular device 506 is in range of the network device 502 by receiving a connection request from the cellular device 506. For example, the cellular device 506 may be configured to automatically connect to registered devices (e.g., the registered network device) when the cellular device 506 is within range of the network device 502. The cellular device 506 may generate a signal for the network device 502 when the cellular device 506 is within range of the network device 502. The network device 502 may be configured to determine that the cellular device 506 is within range of the network device 502 responsive to receiving the signal from the cellular device 506. In some embodiments, the network device 502 may be configured to periodically scan for registered cellular devices 506 within range of the network device 502. For example, the network device 502 may be configured to periodically generate and transmit (e.g., every second, five seconds, 10 seconds, minute, five minutes, etc.) a ping for the registered cellular devices 506. When the network device 502 receives a response from a registered cellular device 506, the network device 502 may be configured to determine that the registered cellular device 506 is within range of the network device 502.

The network device 502 may be configured to establish one or more connections with the cellular devices 506. The network device 502 may be configured to establish connections with the cellular devices 506 by exchanging various keys (e.g., public/private keys), authentication stages, and so forth. The network device 502 may be configured to establish connections with cellular devices 506 within range of the network device 502. In some embodiments, the network device 502 may be configured to generate a plurality of connections (e.g., a first connection with the first cellular device 506(1), a second connection with the second cellular device 506(2), etc.). In some embodiments, the network device 502 may be configured to maintain a connection with each of the cellular devices 506 within range. For example, at a given point in time, the network device 506 be configured to maintain a connection with any number of cellular devices 506 which were previously-registered with the network device 506 and are in range of the network device 506.

In some embodiments, such as the embodiment shown in FIG. 5, the network device 502 may be configured to cause the cellular devices 506 to establish connections with a second network device 512. The network device 502 may be configured to cause the cellular devices 506 to establish connections with the second network device 512 by transmitting an address associated with the second network device 512 to the cellular devices 506 responsive to connecting with the cellular devices 506. The cellular devices 506 may be configured to automatically establish a connection with the second network device 512 using the address for the second network device 512 received from the first network device 502. The second network device 512 may be a SD-WAN device similar to the network device 502. The second network device 512 may be configured to receive requests, packets, data, etc. from the cellular devices 506, and route such data to the internet 510. The second network device 512 may similarly receive data from an internet 510 data source and provide such data via the cellular devices 506 back to the first network device 502 for transmitting to the client 504.

In some embodiments, the second network device 512 may be located at a remote location relative to the first network device 502. For instance, the second network device 512 may be located at a location corresponding to an enterprise (e.g., a main office for example), and the first network device 512 may be located at a different location corresponding to an enterprise (e.g., at a satellite office for example). In some embodiments, the second network device 512 may be housed in the same building (e.g., potentially out of range from the WIFI range) as the first network device 502. For example, the second network device 512 may be located in an apartment building or complex, and the first network device 502 may be located in the individual apartments. As described in greater detail below, the second network device 512 may be configured to monitor traffic conditions from the respective cellular devices 506 similar to the first network device 502. In such embodiments, the first and second network devices 502, 512 may be configured to leverage the network traffic conditions for packet-by-packet routing both from the first to the second network device 502, 512 and from the second to the first network device 512, 502 via the cellular devices 504.

The network device 502 may be configured to receive various requests from the client 504. The requests may requests to establish a connection with a data source (e.g., an internet-based data source). The client 504 may be configured to generate the requests for the network device 502 based on user inputs (e.g., the user entering an address on a browser, the user selecting or launching an application which requires internet access, the user turning on a device which requires internet access, etc.). The client 504 may be configured to transmit the request to the network device 502 for routing to one of the cellular devices 506, as described in greater detail below.

The network device 502 may be configured to route, provide, send, or otherwise transmit requests from clients 504 to the data source. The network device 502 may be configured to transmit requests to the data source via one of the connections to a cellular device 506. In some embodiments, the network device 502 may be configured to select which connection for which to use for transmitting the request from the clients 504 to the data source. In some embodiments, the network device 502 may be configured to select a connection for which to route network traffic, for which to route individual packets of network traffic, etc. The network device 502 may be configured to select the connection based on monitored conditions of the respective connections. The network device 502 may be configured to select the connection based on a priority received from a client 504.

In some embodiments, the network device 502 may be configured to receive a priority of a particular cellular device 506 connection from a client 504. For example, a user may prioritize their own cellular device 506 for transmitting and receiving network traffic corresponding to clients 504 operated by the user. The user may generate a priority on the client 504, on the cellular device 506, etc., which may be transmitted, sent, or otherwise provided (e.g., with the request to connect to a particular data source or separate from the request) to the network device 502. The network device 502 may be configured to select a connection according to the priority selected by the user. For example, where a user prioritizes the first cellular device 506(1), the network device 502 may be configured to select the connection to the first cellular device 506(1) for routing network traffic of the client 504 corresponding to the user. In some embodiments, the network device 502 may select a connection according to a priority without regard to conditions corresponding to the connection. In other words, where a user prioritizes a particular connection, the network device 502 may automatically use the prioritized connection for network traffic corresponding to the user.

In some embodiments, the network device 502 may be configured to measure, detect, determine, or otherwise identify various network conditions corresponding to the respective connections. In embodiments in which a network device 502, 512 is arranged on opposite sides of the cellular devices 504 (e.g., as shown in FIG. 5B), both network devices 502, 512 may be configured to identify various network conditions corresponding to the respective connections. The network device 502 may be configured to select a connection for which to route network traffic based on the identified conditions. Where the network device selects a connection for which to route network traffic, packets may flow between the client 504 and data source via the same cellular device 504. Where both network devices 502, 512 are identifying network conditions corresponding to the connections, the network devices 502, 512 may be configured to select a connection for which to route individual packets of the network traffic based on the identified conditions. Where the network device selects a connection for which to route individual packets, in some instances, packets may flow from the client 504 to the data source via one cellular device 504, and another packet may flow from the data source to the client 504 via another cellular device 504. Hence, where a network device 502, 512 is arranged on both sides of the WAN (e.g., as shown in FIG. 5B), the network devices 502, 512 may select connections based on the network conditions for new packets. On the other hand, where a network device 502 is only arranged at the client-side (e.g., at the client premises), the network device 502 may select connections based on network conditions for new network traffic flows.

In some embodiments, a network condition may be or include a received signal strength indicator (RSSI) value corresponding to the connections. In some embodiments, the network devices 502, 512 may be configured to measure a received signal strength indicator (RSSI) corresponding to the connections to the cellular devices 504. The network devices 502, 512 may be configured to measure an RSSI value corresponding to the connections by generating a ping and receiving a response from the cellular devices 504. The network devices 502, 512 may be configured to measure the RSSI value using the response. The network devices 502, 512 may be configured to compute the RSSI value based on a power of the received response from the cellular devices 506. In some embodiments, the network devices 502, 512 may be configured to select connections for which to route packets or traffic flow based on which of the connections has a highest RSSI value. While described as RSSI value, the network devices 502, 512 may be configured to measure, quantify, determine, or otherwise identify other network conditions such as, for example, latency/packet loss/jitter/etc. The network devices 502, 512 may be configured to select connections for which to route packets or traffic flow based on which of the connections result in lowest latency, lower likelihood of packet loss, lowest jitter, and so forth.

In some embodiments, the network devices 502, 512 may be configured to include, maintain, or otherwise access a plurality of thresholds corresponding RSSI values (or other network conditions) for a connection. For example, the network devices 502, 512 may access a first threshold corresponding to a first range of RSSI values (e.g., between 0 dBm and −60 dBm), a second threshold corresponding to a second range of RSSI values (e.g., between −61 dBm and −70 dBm), a third threshold corresponding to a third range of RSSI values (e.g., between −71 dBm and −90 dBm), etc. Each threshold may correspond to different usage for the particular connection. For example, connections having an RSSI value within the first range of RSSI values may be used for real-time and high quality traffic, connections having an RSSI value within the second range of RSSI values may be used for lesser important (or low priority) traffic, connections having an RSSI value within the third range of RSSI values may be used as a last resort, and connections having an RSSI value below the third range of RSSI values (e.g., less than −90 dBm) may be avoided or not used if there are any other connections which are available.

The network devices 502, 512 may be configured to compare the measured RSSI values for the connections to each of the cellular devices 506 with which the network devices 502, 512 are connected to the respective thresholds. The network devices 502, 512 may be configured to select connections for which to route network traffic (or individual packets of the network traffic) based on the comparison. For example, where as shown in FIG. 5A, a single network device 502 is provided, the network device 502 may compare an RSSI value of the connection to the first cellular device 506(1) to the thresholds. Similarly, the network device 502 may compare the RSSI value of the connection to the second cellular device 506(2) to the thresholds. The network device 502 may be configured to determine that the RSSI value of the connection to the first cellular device 506(1) is within the second range of RSSI values, and the RSSI value of the connection to the second cellular device 506(2) is within the first range of RSSI values. The network device 502 may be configured to route network traffic flow to the second cellular device 506(2) since the RSSI value of the connection to the second cellular device 506(2) is in the first range of RSSI values, whereas the RSSI value of the connection to the first cellular device 506(1) is in the second range of RSSI values.

In some embodiments, the network devices 502, 512 may be configured to route individual packets of network traffic based on the network conditions corresponding to the connections to the cellular devices 506. For example, the network device 502, 512 may be configured to route a first portion of packets of network traffic to one of the cellular devices 506 and a second portion of packets of the network traffic to a different cellular device 506. In some embodiments, the network devices 502, 512 may be configured to select connections on a packet-by-packet basis. The network devices 502, 512 may be configured to select the connections based on the network conditions corresponding to the respective connections (e.g., an RSSI value, a value corresponding to latency, a number of lost packets, a value corresponding to network jitter, etc.). The network devices 502, 512 may dynamically switch between connections based on the monitored network conditions. For example, as conditions of a connection decrease over time (e.g., when the corresponding cellular device 506 moves out of range from the network device 502, for instance), the network devices 502, 512 may be configured to determine whether there are any better connections available (e.g., having conditions which are better than the current connection being used). As new connections (which have better network conditions) become available (as the corresponding cellular devices 506 move closer to the network device 502 within the premises, for example), the network device 502 may correspondingly switch between available connections (e.g., either switch network traffic flow, select route individual packets differently, etc.).

Figure 6A:
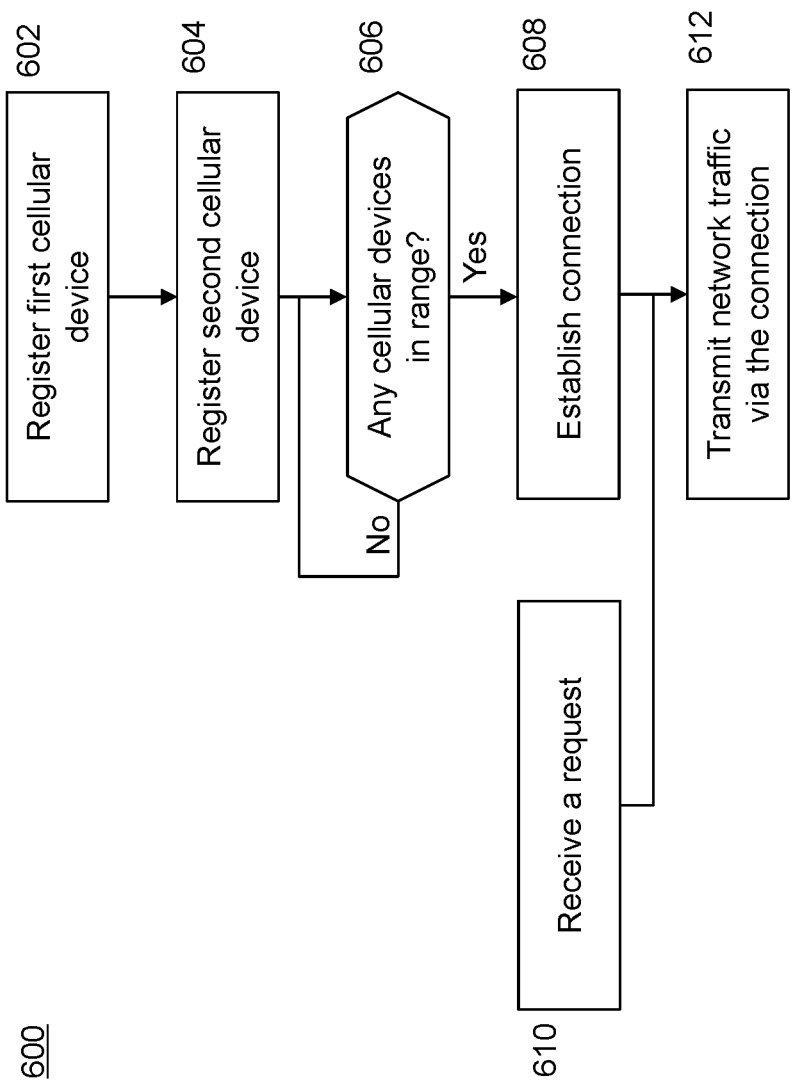
FIG. 6A is a flow diagram of a method for multi-link SD-WAN using cellular device connections, in accordance with an illustrative embodiment.

Referring to FIG. 6A, depicted is a flowchart showing a method 600 of multi-link SD-WAN using phone mobile hotspots according to an illustrative embodiment. The method 600 (including various steps included therein) may be implemented by one or more of the components shown in FIG. 5A-5B and described above, such as the network device(s) 502, 512, the client(s) 504, cellular devices 506, etc. As a brief overview, at step 602, a network device registers a first cellular device. At step 604, the network device registers a second cellular device. At step 606, the network device determines whether any cellular devices are in range. At step 608, the network device establishes a connection. At step 610, the network device receives a request. At step 612, the network device transmits network traffic via the connection.

At step 602, and in some embodiments, a network device registers a first cellular device. In some embodiments, the network device may register a first cellular device having a first cellular connection. The network device may register the first cellular device responsive to receiving a registration request from the first cellular device. A user may initiate registration of the first cellular device at the first cellular device (e.g., by selecting the network device at the first cellular device). In some embodiments, the network device may register a connection with the first cellular device. The connection may be a BLUETOOTH connection. Accordingly, the network device may register the first cellular device responsive to a user of the first cellular device pairing the first cellular device with the network device. The first cellular device may pair with the network device by exchanging various handshake, authentication, etc. packets responsive to the user initiating pairing of the devices.

In some embodiments, the first cellular device may have a cellular (e.g., 3G, LTE, 4G, 5G, etc.) connection. Accordingly, the first cellular device may be capable of using the cellular connection to access the internet. The first cellular device may output a mobile device hotspot. The mobile device hotspot may be a network (e.g., a local network) which is accessible by other devices located within range of the first cellular device. Where a device is within range of the first cellular device and connected to the mobile device hotspot, the device may leverage the cellular connection of the first cellular device. For example, the device may send network traffic, packets, requests, etc. for various internet-based data sources through the first cellular device.

At step 604, and in some embodiments, the network device registers a second cellular device. In some embodiments, the network device may register a second cellular device having a second cellular connection. The network device may register the second cellular device in a manner similar to registering the first cellular device at step 602. The second cellular device may be similar in some respects to the first cellular device. For example, the second cellular device may be paired with the network device, the second cellular device may have a cellular connection, the second cellular device may output a mobile device hotspot, etc. Hence, step 604 may be substantially the same as step 602. In some embodiments, the network device may register a plurality of cellular devices (e.g., more than two cellular devices). For example, where the network device is arranged in a household and members of the household have four cellular devices, each of the members may register their cellular devices with the network device. Accordingly, the network device may register with any number of cellular devices. As described in greater detail below, the network device may leverage the cellular connections of the cellular devices for network traffic from a plurality of clients.

At step 606, and in some embodiments, the network device determines whether any cellular devices are in range. In some embodiments, the network device may determine that one of the first or second cellular devices are within range of the network device. In some embodiments, the network device may determine that one of the cellular device(s) are in range by sending a ping at various intervals to the registered cellular devices. Where cellular devices respond to the ping, the network device may determine that the corresponding cellular device is within range of the network device. In some embodiments, the cellular devices may automatically connect to the network device when the cellular devices are within range of the network device. As the cellular devices are capable of moving freely into, out of, and about a premise, the cellular devices may at times be within range of the network device and, at other times, be out of range of the network device. The network device may thus iteratively search for registered cellular devices within range of the network device. In some embodiments, the network device may iteratively search for registered cellular devices within range of the network device until the network device discovers a cellular device in range. In some embodiments, the network device may iteratively search for registered cellular devices, even when there are currently cellular devices in range.

At step 608, and in some embodiments, the network device establishes a connection. In some embodiments, the network device establishes a connection with one of the first or second cellular device. In some embodiments, the network device establishes a connection with one of the first or second cellular device based on the respective cellular device being within range of the network device. In some embodiments, the network device may establish a connection with each of the cellular devices which are in range of the network device. For example, the network device may establish a first connection with the first cellular device, a second connection with the second cellular device, and so forth (e.g., where the first cellular device and the second cellular device are in range of the network device). In some embodiments, the network device may automatically establish connections with the cellular devices upon the cellular devices being within range of the network device. In some embodiments, the network device may generate a prompt or request to establish a connection with a cellular device. The cellular device may receive the request from the network device. A user of the cellular device may select an option to approve or deny the connection. The network device may establish a connection with the cellular device upon receiving an approval.

In some embodiments, the network device may cause the cellular devices to establish a connection with another network device. For example, the network device may be a first network device downstream from the cellular devices (e.g., on premises of the cellular devices). A second network device may be arranged upstream from the cellular devices. The first network device, upon establishing a connection with a cellular device, may cause the cellular device to establish a connection with the second network device. The first network device may cause the cellular device to establish the connection with the second network device by sending a packet including an address of the second network device to the cellular device. The cellular device may automatically establish a connection with the second network device responsive to receiving the packet from the first network device.

In some embodiments, where the network device establishes multiple connections at step 608, the network device may monitor conditions of the connections to the cellular devices. For example, the network device may monitor conditions corresponding to an RSSI of the connection to each of the cellular devices, conditions corresponding to a latency of the connection to each of the cellular devices, conditions corresponding to lost packets for the connection to each of the cellular devices, conditions corresponding to jitter of the connection to each of the cellular devices, etc. In embodiments where the cellular devices are connected to two network devices, both network devices may monitor conditions of the connections to the cellular devices. As described in greater detail below, the network device(s) may use the monitored conditions for selecting a connection to a cellular device for which to route network traffic (or packets of the network traffic) between the client and internet-based data sources.

At step 610, and in some embodiments, the network device receives a request. In some embodiments, the network device may receive a request from a client. The request may be a request to establish a connection with a data source. The data source may be an internet-based data source (e.g., a server which is remote to the client and hosting a service such as a website, an application, etc.). The request may be a domain name, an address for the data source, etc. The network device may receive a request from the client via network corresponding to the network device and client. For example, the network device may output a wireless network (such as a Wi-Fi network). The client may be connected to the wireless network of the network device. The client may send requests to the network device via the wireless network. The network device may receive the requests from the client, and route network traffic (or packets of network traffic) to connected cellular devices, as described in greater detail below.

In some embodiments, the network device may receive a priority of a cellular device registered with the network device. The network device may receive the priority from the client. A user of the client may select a priority setting at the client for a particular cellular device. For example, the user may prioritize their own cellular device for traffic from their clients. The network device may maintain a list or ledger of clients and corresponding prioritized cellular devices. The network device may select connections for which to transmit network traffic based on the priority received from the client. For example, where a user of a client prioritizes their own cellular device, the network device may select the connection to the user's cellular device for network traffic corresponding to the user's client. In some embodiments, the network device may receive a priority from a client for prioritizing a connection for a group of clients (e.g., each of the clients, a subset of the clients in the premises). The network device may select the connection for the group of clients according to the priority from the client.

At step 612, and in some embodiments, the network device transmits network traffic via the connection. In some embodiments, the network device may transmit network traffic corresponding to the request (e.g., received at step 610) from the client via the connection (e.g., established at step 608) to the data source. In some embodiments, the network device may transmit packets of the network traffic via the connection to the data source. In embodiments in which the network device establishes multiple connections (e.g., at step 608), the network device may route, provide, or otherwise transmit some network traffic (e.g., traffic flow, packets of the network traffic, etc.) via one of the connections, and the network device may transmit some network traffic via another one of the connections. Such embodiments may provide for bandwidth aggregation by leveraging multiple connections for routing network traffic. In some embodiments, such as embodiments similar to those shown in FIG. 5B, both network devices may route network traffic or packets of the network traffic between multiple connections. Such network devices may route the network traffic/packets based on the priority settings from the user, based on monitored network conditions, etc. Such embodiments may provide for packet-by-packet switching to optimize network conditions.

In some embodiments, the network device(s) may select which connection(s) to use for transmitting network traffic based on the priority selected by the user via their respective client. For example, the network device may route network traffic for a client to a particular cellular device in accordance with the priority of the cellular device from the client. In some embodiments, the network device may select which connection(s) to use for transmitting network traffic based on the monitored conditions of the connections.

In some embodiments, the network device(s) may transmit various portions of network packets of the network traffic via the connections to the cellular devices. For example, the network device(s) may transmit a portion of network packets of the network traffic which corresponds to high priority traffic (for example, live streaming, real-time traffic, etc.) via one connection to one cellular device, and the network device(s) may transmit another portion of network packets of the network traffic which corresponds to lower priority traffic via other connection(s) to other cellular device(s). The network device(s) may select which cellular devices receive the high priority traffic and which cellular devices receive the lower priority traffic based on the monitored conditions. In some embodiments, the network device(s) may maintain, include, or otherwise access various thresholds corresponding to the monitored conditions. The network device(s) may apply the monitored conditions to the thresholds to select which connections receive high priority traffic and which connections receive the lower priority traffic. For example, the network device(s) may select connections having an RSSI value within a first range (0--60 dBm) for high priority traffic, and may select connections having an RSSI value within a second range (−61 dBm--−70 dBm) for lower priority traffic.

In some embodiments, the network device(s) may select which connections to use for routing individual packets of the network traffic. For example, the network device(s) may switch between connections on a packet-by-packet basis based on the monitored network conditions (e.g., based on a comparison of the network conditions to each other, based on a comparison of the network conditions to the thresholds, etc.). Hence, a network device may receive a first packet of the network traffic for a client via one connection to one cellular device, and the network device may receive a second packet of the network traffic for the same client via another connection to another cellular device. Such instances may occur as network conditions change over time. Similarly, a network device may switch between connections to use for network traffic flow based on the monitored network conditions (e.g., based on a comparison of the network conditions to each other, based on a comparison of the network conditions to the thresholds, etc.). The network device may switch between connections for traffic flow as the conditions change over time. As noted above, the network conditions may change due to movement of the cellular device (e.g., about the premises, leaving the premises, etc.). For example, where the cellular device is determined to be out of range (e.g., because the RSSI value for the cellular device falls below a threshold, because the cellular device becomes disconnected to the network device, etc.), the network device may switch from the connection of the cellular device which is out-of-range to a connection of a cellular device within range of the network device.

Figure 6B:
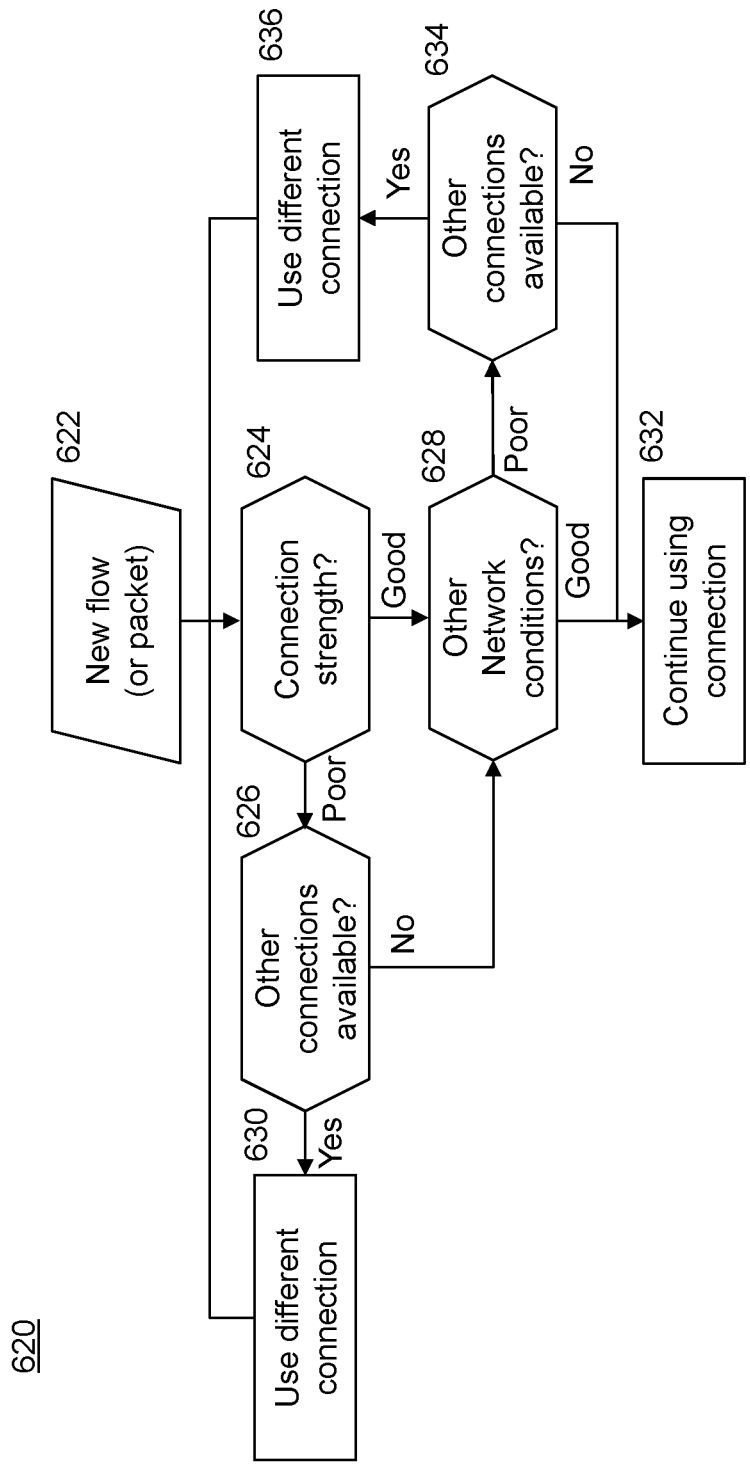
FIG. 6B is a flow diagram showing a method of routing network flow or packets, in accordance with an illustrative embodiment

Referring to FIG. 6B, depicted is a flowchart showing a method 620 of routing network flow or packets according to an illustrative embodiment. The method 620 (including various steps included therein) may be implemented by one or more of the components shown in FIG. 5A-5B and described above, such as the network device(s) 502, 512, the client(s) 504, cellular devices 506, etc. The method 620 may be used to route new incoming flow where, as shown in FIG. 5A, a single network device 502 is used. The method 620 may be used to route individual packets where, as shown in FIG. 5B, network devices 502, 512 are arranged on opposing sides of the cellular devices 506.

At step 622, a network device identifies a new packet or flow. The packet/flow may be from a client, from an internet source, etc. When the network device identifies a new packet or flow, the method 620 may proceed to step 624. At step 624, the network device may check, monitor, or otherwise identify a connection strength (e.g., to a cellular device). The network device may identify the connection strength to a cellular device which is currently (or previously) used by the network device (e.g., for the previous network traffic flow or previous packet). The network device may compare the connection strength to one or more thresholds (e.g., thresholds similar to those described above, such as one or more of the RSSI thresholds). The network device may determine that the connection strength for the connection is poor (e.g., based on the connection strength not satisfying one or more of the thresholds). The network device may determine that the connection strength for the connection is good (e.g., based on the connection strength satisfying one or more of the thresholds). Where the network device determines the connection strength is poor, the method 620 may proceed to step 626. However, where the network device determines the connection strength is good, the method 620 may proceed to step 628.

At step 626, the network device may determine whether there are any further connections available. The network device may determine that connections are available based on the network device establishing further connections with other cellular devices within range of the network device. Where the network device determines there are additional connections, the network device may determine to use one of those additional connections for the new flow/packet (step 630). The method 620 may then loop back to step 624 and monitor the connection strength of the additional connection. However, where, at step 626, there are not any additional connections available, the method 620 may proceed to step 628.

At step 628, the network device monitors various network conditions corresponding to the connection. For example, the network device monitors latency, lost packets, jitter, etc.

The network device may compare the network conditions to various thresholds (similar to monitoring connection strength at step 624). The network device may determine that the network conditions for the connection are poor (e.g., based on the network conditions not satisfying one or more of the thresholds). The network device may determine that the network conditions for the connection are good (e.g., based on the network conditions satisfying one or more of the thresholds). Where the network device determines the network conditions are poor (e.g., high latency, high number of packet losses, significant jitter), the method 620 may proceed to step 634. However, where the network device determines the network conditions are good (e.g., low latency, low number of packet losses, insignificant jitter), the method 620 may proceed to step 632, where the network device continues using the connection which is being monitored. At step 634, the network device determines whether any additional connections are available (similar to step 626). Where there are additional connections available, at step 636, the network device may use one of the additional connections (similar to step 630), and the method 620 may loop back to step 624. However, where there are not any additional connections at step 634, the method 620 may proceed to step 632, where the network device continues using the connection which is being monitored, despite the poor network conditions.

Various elements, which are described herein in the context of one or more embodiments, may be provided separately or in any suitable sub-combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method, comprising:
   maintaining, by a network device, respective short range connections between the network device and a first registered mobile device and a second registered mobile device;
   receiving, by the network device from a client device, a request to access a server, the network device intermediary to the client device and at least one of the first registered mobile device and the second registered mobile device;
   selecting, by the network device, from the respective short range connections, responsive to receiving the request, a selected short range connection between the network device and 1) the first registered mobile device or 2) the second registered mobile device, via which the network device is to transmit network traffic corresponding to the request, wherein the first registered mobile device and the second registered mobile device are registered with the network device and having a respective cellular connection; and
   transmitting, by the network device, network traffic corresponding to the request from the client device via the selected short range connection to the first or second registered mobile device, to cause the first or second registered mobile device to send the network traffic via the respective cellular connection to the server.

2. The method of claim 1, wherein the network device is a first network device downstream from the first mobile device and the second mobile device, and wherein the short range connection is a first short range connection, the method further comprising:
   causing, by the first network device, a plurality of second short range connections to be established by the first mobile device and the second mobile device to a second network device arranged upstream from the first mobile device and the second mobile device.

3. The method of claim 2, further comprising:
   transmitting, by the first network device, a first portion of network packets of the network traffic via the first short range connection to the first mobile device; and
   transmitting, by the first network device, a second portion of network packets of the network traffic via a third short range connection to the second mobile device.

4. The method of claim 3, further comprising:
   receiving, by the first network device from the second network device via the first short range connection to the first mobile device, a first packet of the network traffic for the client device; and
   receiving, by the first network device from the second network device via the second short range connection to the second mobile device, a second packet of the network traffic for the client device.

5. The method of claim 1, further comprising:
   receiving, by the network device from the client device, a priority of the first mobile device relative to the second cellular device; and
   selecting, by the network device, the short range connection between the network device and the first mobile device via which the network device is to transmit the network traffic corresponding to the request based on the priority from the client device.

6. The method of claim 1, further comprising:
   establishing, by the network device, a first short range connection with the first mobile device; and
   establishing, by the network device, a second short range connection with the second mobile device, wherein one of the first short range connection or the second short range connection comprises one of a Bluetooth connection or a Wi-Fi connection.

7. The method of claim 6, further comprising:
   determining, by the network device, that the first mobile device is out of range from the network device; and
   routing, by the network device, the network traffic of the first short range connection to the short range second connection.

8. The method of claim 1, wherein the short range connection is a first short range connection with the first mobile device, the method further comprising:
   monitoring, by the network device, one or more first conditions of the first short range connection between the network device and the first mobile device; and
   monitoring, by the network device, one or more second conditions of a second short range connection between the network device and the second mobile device.

9. The method of claim 8, further comprising:
   switching, by the network device, from the first short range connection to the second short range connection for which to route network traffic based on the one or more first conditions and the one or more second short range conditions.

10. The method of claim 9, wherein switching from the first short range connection to the second short range connection is performed based on a comparison of the one or more first conditions to a threshold and a comparison of the one or more second short range conditions to the threshold.

11. A system, comprising:
a network device configured to:
maintain respective short range connections between the network device and a first registered mobile device and a second registered mobile device;
receive, from a client device, a request to access a server, the network device intermediary to the client device and at least one of the first registered mobile device and the second registered mobile device;
select, from the respective short range connections, responsive to receiving the request, a selected short range connection between the network device and 1) the first registered mobile device or 2) the second registered mobile device, via which the network device is to transmit network traffic corresponding to the request, the first registered mobile device and the second registered mobile device registered with the network device and having a respective cellular connection; and
transmit network traffic corresponding to the request from the client device via the selected short range connection to the first or second registered mobile device, to cause the first or second registered mobile device to send the network traffic via the respective cellular connection to the server.

12. The system of claim 11, wherein the network device is a first network device downstream from the first mobile device and the second mobile device, the short range connection is a first short range connection, and wherein the first network device is further configured to:
cause a plurality of second short range connections to be established by the first mobile device and the second mobile device to a second network device arranged upstream from the first mobile device and the second mobile device.

13. The system of claim 12, wherein the first network device is further configured to:
transmit a first portion of network packets of the network traffic via the first short range connection to the first mobile device; and
transmit a second portion of network packets of the network traffic via a third short range connection to the second mobile device.

14. The system of claim 13, wherein the first network device is further configured to:
receive, from the second network device via the first short range connection to the first mobile device, a first packet of the network traffic for the client device; and
receive, from the second network device via the second short range connection to the second mobile device, a second packet of the network traffic for the client device.

15. The system of claim 11, wherein the network device is further configured to:
receive, from the client device, a priority of the first mobile device relative to the second mobile device; and
select the short range connection between the network device and the first mobile device via which the network device is to transmit the network traffic corresponding to the request based on the priority from the client device.

16. The system of claim 11, wherein the network device is further configured to:
establish a first short range connection with the first mobile device; and
establish a second short range connection with the second mobile device, wherein one of the first short range connection or the second short range connection comprises one of a Bluetooth connection or a Wi-Fi connection.

17. The system of claim 16, wherein the network device is further configured to:
determine that the first mobile device is out of range from the network device; and
route the network traffic of the first short range connection to the second short range connection.

18. The system of claim 11, wherein the short range connection is a first short range connection with the first mobile device, and wherein the network device is further configured to:
monitor one or more first conditions of the first short range connection between the network device and the first mobile device; and
monitor one or more second conditions of a second short range connection between the network device and the second mobile device.

19. The system of claim 18, and wherein the network device is further configured to:
switch, from the first short range connection to the second short range connection for which to route network traffic based on the one or more first conditions and the one or more second conditions.

20. The system of claim 19, wherein switching from the first short range connection to the second short range connection is performed based on a comparison of the one or more first conditions to a threshold and a comparison of the one or more second conditions to the threshold.

* * * * *